United States Patent [19]

Madewell

[11] 4,047,096

[45] Sept. 6, 1977

[54] APPARATUS FOR INSTANTLY COMPENSATING FOR LINE VOLTAGE IRREGULARITIES

[75] Inventor: George Robison Madewell, Hixson, Tenn.

[73] Assignee: Combustion Engineering, Inc., Windsor, Conn.

[21] Appl. No.: 696,452

[22] Filed: June 15, 1976

[51] Int. Cl.² .............................................. G05F 3/04
[52] U.S. Cl. ................................. 323/19; 219/131 R; 323/24; 323/39
[58] Field of Search ....................... 307/252 B, 252 T; 323/4, 19, 225 C, 24, 36, 39; 219/131 R

[56] References Cited

U.S. PATENT DOCUMENTS

| | | | |
|---|---|---|---|
| 3,226,627 | 12/1965 | Fromkin | 323/24 X |
| 3,335,318 | 8/1967 | Yancey | 323/24 UX |
| 3,479,560 | 11/1969 | Paget et al. | 323/36 UX |
| 3,548,290 | 12/1970 | Swinehart | 323/36 X |
| Re. 26,866 | 4/1970 | Storm | 323/4 |

*Primary Examiner*—A. D. Pellinen
*Attorney, Agent, or Firm*—Joseph H. Born

[57] ABSTRACT

An apparatus for compensating for line voltage variations in a pulsed welding arc supply. A circuit for drawing a current that is proportional to that part of the supply voltage in excess of a predetermined reference is drawn from the capacitor charging circuit in a UJT triggering device. Thus, the more the line voltage exceeds the desired level, the greater is the compensating current withdrawn from the capacitor charging circuit. As a result, the average welding current remains at the desired level despite supply-voltage variations.

3 Claims, 2 Drawing Figures

APPARATUS FOR INSTANTLY COMPENSATING FOR LINE VOLTAGE IRREGULARITIES

BACKGROUND OF THE INVENTION

In the art of arc welding, it has been discovered that welding in narrow grooves can be done very effectively by pulsing the current in the arc. This is typically done by allowing the flow of current in response to line voltages to occur only for short periods toward the end of each half cycle of the supply voltage. One of the difficulties attending this method, however, is the fact that it is particularly sensitive to line-voltage variations. It is desirable in these applications that the average current in each pulse be equal, but due to power supply variations, the average current produced by this method varies unless preventative steps are taken.

The obvious response to this problem is to regulate the supply voltage, thereby maintaining a constant average current once the duty cycle is set. Unfortunately, means for accomplishing regulation of the AC supplies tend to be rather elaborate and expensive. An example is the motor-driven variable transformer. This is obviously rather elaborate and in addition has a slow response. The slow response, of course, makes the variable transformer relatively ineffective at insuring that each pulse has the same average current. A faster response is afforded by the constant-voltage transformer, but it also is large and expensive and tends to limit its usefulness to equipment that can tolerate its current-limiting action. As a result, what is needed is a fastacting and inexpensive means for compensating for line-voltage variations.

SUMMARY OF THE INVENTION

The present invention fulfills this need by adjusting the duty cycle of the arc pulse. Since the firing of the means for controlling the current usually occurs in response to the charging of the capacitor, the present invention uses the amplitude of the supply voltage to control the amplitude of a current signal that is subtracted from the charging current. More particularly, the current signal is roughly proportional to the amount by which the absolute value of the supply voltage exceeds a reference level.

DETAILED DESCRIPTION OF THE PREFERRED EMBODIMENT

Figure 1:
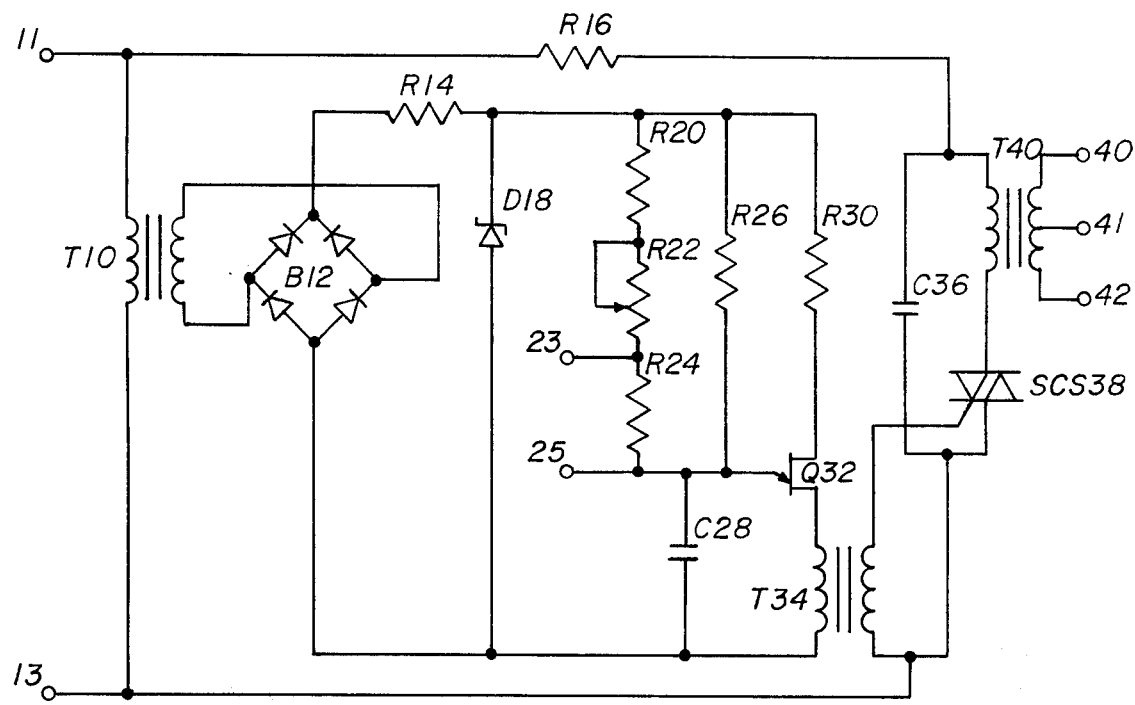
FIG. 1 is a schematic diagram of the type of current-control circuit with which the apparatus of the present specification is to be used.

The circuit of FIG. 1 receives 115-volt signal that is in phase with the voltage source that supplies power to the arc. This signal is received at terminals 11 and 13, and the circuit processes this signal to provide pulses at terminals 40, 41, and 42. These pulses are used to gate SCR's, not shown in the figures, that control the supply current in the arc welder. The 115-volt signal is stepped down to a 12-volt signal in transformer T10, which is rectified by bridge B12 and clipped at 12 volts by R14 and D18, which is a 12-volt zener. The resulting rectified and clipped sine wave is applied to the charging circuit composed of R20, R22, R24, R26, and C28. Thus, T10, B12, R14, and D18 comprise a charging-voltage source. The R20 - R22 combination is referred to in the claims as a "first series resistance."

C28 begins charging at the beginning of each half cycle, and it continues charging until it reaches a trigger voltage equal to the turn-on voltage of Q32, a unijunction transistor. When the turn-on voltage is reached, C28 quickly discharges through Q32, producing a pulse in T34. The pulse triggers silicon-controlled switch SCS38, allowing it to conduct through the rest of the half cycle. By adjusting 100-kilohm potentiometer R22, the operator can vary the amount of time it takes to charge up capacitor C28. This in turn controls the duty cycle of SCS38.

Since SCS38 prevents current from flowing through the primary of T40 until it receives a gate signal from T34, the current is zero in T40 during the first part of each half cycle of the waveform appearing between terminals 11 and 13. During this time, C36 charges through R16. Due to the short time constant of the R16 - C36 combination, the voltage across C36 is nearly equal to that across terminals 11 and 13. When C28 caused Q32 to fire, the resultant pulse turns on SCS38, permitting current to flow through T40. The quick jump in current is aided by C36, which discharges into T40, thereby quickly bringing the current in the primary of T40 up to the level dictated by the voltage at terminals 11 and 13 and the resistance of R16. SCS38 remains on during the rest of the half cycle and turns off when the voltage at terminals 11 and 13 nears zero. The result is a series of pulses of alternating polarity, each one of which begins toward the end of a half cycle. This signal is reproduced by T40 at terminals 40, 41, and 42 and is used to trigger the SCR's in the welding-arc circuit.

It was previously observed that the point in the half cycle at which the pulses produced by Q32 occur can be adjusted by means of potentiometer R22, which varies the charging time of C28. However, R22 is not the only means of varying the triggering time of Q32. Even though the signal at the output of bridge B12 is clipped by zener diode D18, and increased amplitude in the voltage occurring between terminals 11 and 13 would cause a change in charging time for C28 because a larger voltage would cause the 12-volt clipping potential to be reached sooner, shortening the charging time of C28. This increases the duty cycle, which is just the opposite of the desired effect; when the supply voltage increases, the duty cycle should decrease in order to maintain the desired average current.

Figure 2:
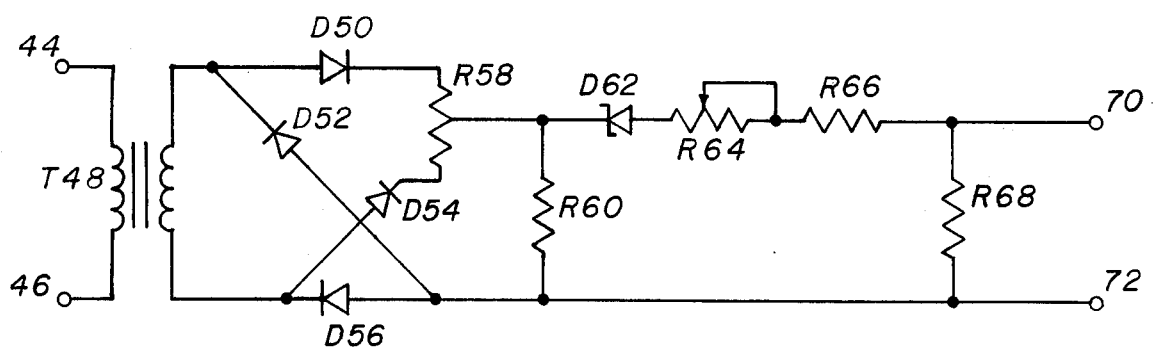
FIG. 2 is a schematic diagram of the preferred embodiment of the present invention.

In order to reverse this effect, the circuit of FIG. 2 is connected to the circuit of FIG. 1. Terminals 44 and 46 of FIG. 2 are connected to terminals 11 and 13, respectively, of FIG. 1, and terminals 70 and 72 of FIG. 2 are connected to terminals 23 and 25, respectively, of FIG. 1. This connects R68 across R24, and the parallel combination of R24 and R68 is referred to in the claims as a "second series resistance." T48 steps the 115-volt signal appearing between terminals 44 and 46 down to a 12-volt signal and applies it to the D50-D52-D54-D56 full-wave rectifying circuit. The full-wave-rectified signal is applied to R58 and R60, the wiper of R58 being adjusted to produce equal amplitudes in the alternate half waves. D62, an 8.2-volt zener, performs a function just opposite that of zener D18 of FIG. 1. Rather than clipping off the tops of the half waves, as D18 does, D62 clips off the bottoms, preventing current from flowing until the voltage across it reaches 8.2 volts. D62 will be recognized as a means for maintaining a relatively high incremental impedance between its terminals when the voltage drom from its first terminal to its second terminal is below a threshold value and for maintaining a relatively low incremental impedance between its terminals when the voltage drop from the first terminal to the second terminal is above the threshold value.

Because the voltage in the T48 secondary is the same as that in the T10 secondary, the potential difference across R24 never exceeds the potential difference across R60, and D62 is therefore never forward biased. This means that the only effect that the circuit of FIG. 2 has on the charging current through R20 and R22 when the turn-on voltage of D62 has not been reached is that caused by the fact that R68 is in parallel with R24. In other words, the part of FIG. 2 to the left of R68 can be thought of as one part of a loop, while the parallel combination of R24 and R68 can be thought of as the completion of the loop, and current flows around the loop only when D62 reaches its zener voltage. This occurs only when the supply voltage exceeds a threshold voltage determined by D62, by an amount that is greater than a value proportional to the uncompensated voltage drop across R24. More specifically, the threshold is roughly equal to the zener voltage of D62 multiplied by the turns ratio of T48, and the proportional value is roughly the uncompensated voltage across R68 multiplied by the turns ratio of T48. Furthermore, the average amount of loop current is greatest when the amplitude of the sinusoidal voltage across terminals 44 and 46 is greatest, which is when the supply-voltage amplitude is greatest. It is for this reason that the part of FIG. 2 to the left of R68 is referred to in the claims as a "means, connected across the second resistance and thereby forming a loop comprising itself and the second series resistance, for causing a current to flow in the loop that increases as supply voltage increases."

The result of the loop currents is that when supply voltage increases, the potential difference across R24 is higher for a longer period of time. Since the total voltage drop across R20, R22, R24, and C28 is determined independently of the voltage drop across R24, a greater voltage drop across R24 results in a smaller drop across R20 and R22. It can be seen that the current flow through R20 and R22 is the charging current of C28, so an increase in potential in R24 results in a decrease in charging current to C28. Thus, the charging current of C28 tends to be decreased by the action of the circuit of FIG. 2 when the power-supply voltage increases. Conversely, when the power supply voltage decreases, there is a smaller potential difference across R24, allowing more current to charge C28. Thus, the circuit of FIG. 2 is a means for subtracting from the charging current a current whose average value increases with supply voltage. The effect of this subtraction of charging current is to delay the firing of SCS38 when the power supply voltage increases and to advance it when the power supply voltage decreases. This tends to compensate for supply-voltage variations.

It has been found that the circuit of the preferred embodiment affords nearly exact compensation through a rather wide range. Pulsed-arc welding works best when the arc is triggered somewhere in the second half of each half cycle of the supply-voltage waveform; if it is triggered earlier, the narrow arc that is characteristics of pulsed-arc welding tends to broaden. Within the desired range, the circuit of the present invention also works best. The circuit of the preferred embodiment, for instance, is designed for a nominal supply voltage of 460 volts and a nominal triggering angle of 130°, and excellent results have been observed with line-voltage variations of as much as ±70 volts. Excursions outside of that range, however, tend to push the duty cycle into a range that is less favorable to the operation of the compensation circuit of the preferred embodiment, and overcompensation occurs at the low voltages, while high voltages cause undercompensation. Even outside its optimum range, however, a compensation circuit according to the present invention gives results that are better than those obtained with uncompensated circuits.

In the practical operation of this circuit, certain initial adjustments must be made. In order to ensure the right amount of compensation, R64, which controls the amount of the FIG.-2-circuit action that is experienced by R24, is adjusted so that the FIG.-2-circuit effect is just enough to compensate for supply-voltage variations. In order to adjust to a given average current, a variable voltage is applied to the supply terminal, and, because the effects of R64 of FIG. 2 and potentiometer R22 of FIG. 1 are not completely independent, both potentiometers must be adjusted until the welding current maintains a substantially constant average value throughout the expected range of input voltages. Experience has shown that two or three adjustments at either end of the expected voltage range are sufficient to completely compensate the apparatus.

While the invention has been described in conjunction with a specific embodiment thereof, it is evident that many modifications will be apparent to those skilled in the art of the foregoing description. Accordingly, it is intended to embrace all such alternatives, modifications, and variations as fall within the broad scope of the appended claims.

What is claimed is:

1. In a current control circuit of the type that triggers means for permitting current from a supply voltage when the charge on a capacitor reaches a trigger level, the capacitor being charged by a charging current, at least part of which is caused by a charging-voltage source and a first series resistance in series with the charging-voltage source that are connected across the capacitor, the improvement comprising:
   a. a second series resistance connected in series with the charging-voltage source, the first series resistance, and the capacitor; and
   b. means, connected across the second series resistance, thereby forming a loop comprising itself and the second series resistance, and including a second voltage source whose value is essentially proportional to the instantaneous value of a rectified version of the supply voltage, for causing current to flow in the loop.

2. An apparatus as recited in claim 1 wherein the means for causing a current to flow in the loop further include means, having a first terminal and a second terminal and connected in series with the second voltage source and the second series resistance, for maintaining a relatively high incremental impedance between the first terminal and the second terminal when the voltage drop from the first terminal to the second terminal is below a threshold value and for maintaining a relatively low incremental impedance between the first terminal and the second terminal when the voltage drop from the first terminal to the second terminal is above the threshold value.

3. A method for improving the operation of a current control circuit of the type that triggers a means for permitting current from a supply voltage when the charge on a capacitor reaches a trigger level, the capacitor being charged by a charging current, at least a part of which charging current is caused by a charging circuit connected across the capacitor, which charging circuit includes, in series, a charging-voltage source, a first series resistance, and a second series resistance, the charging-voltage source thereby causing an uncompensated voltage drop across the second series resistance, comprising the step of impressing a compensating voltage across the second series resistance when the compensating voltage exceeds the uncompensated voltage across the second series resistance, the compensating voltage being proportional to the amount by which the supply voltage exceeds a threshold value.

* * * * *